United States Patent
Hallermann et al.

(10) Patent No.: US 11,460,322 B2
(45) Date of Patent: Oct. 4, 2022

(54) ROTATIONAL ANGLE MEASURING SYSTEM

(71) Applicant: FRABA B.V., Sg Heerlen (NL)

(72) Inventors: Florian Hallermann, Aachen (DE); Hanno Volker, Aachen (DE)

(73) Assignee: FRABA B.V., Sg Heerlen (NL)

(*) Notice: Subject to any disclaimer, the term of this patent is extended or adjusted under 35 U.S.C. 154(b) by 0 days.

(21) Appl. No.: 17/261,032

(22) PCT Filed: Jul. 11, 2019

(86) PCT No.: PCT/EP2019/068690
§ 371 (c)(1),
(2) Date: Jan. 18, 2021

(87) PCT Pub. No.: WO2020/016098
PCT Pub. Date: Jan. 23, 2020

(65) Prior Publication Data
US 2021/0302201 A1  Sep. 30, 2021

(30) Foreign Application Priority Data
Jul. 20, 2018 (DE) ............. 10 2018 117 600.7

(51) Int. Cl.
*G01D 5/14* (2006.01)

(52) U.S. Cl.
CPC ......... *G01D 5/145* (2013.01); *G01D 2205/26* (2021.05)

(58) Field of Classification Search
CPC .............. G01D 5/145; G01D 2205/26
See application file for complete search history.

(56) References Cited

U.S. PATENT DOCUMENTS

| | | | |
|---|---|---|---|
| 8,283,914 B2* | 10/2012 | Mehnert | G01D 5/145 |
| | | | 324/207.13 |
| 8,655,615 B2* | 2/2014 | Mehnert | G01D 5/2455 |
| | | | 702/78 |

(Continued)

FOREIGN PATENT DOCUMENTS

| CN | 101722986 A | 6/2010 |
|---|---|---|
| CN | 101832789 A | 9/2010 |

(Continued)

*Primary Examiner* — Walter L Lindsay, Jr.
*Assistant Examiner* — Milton Gonzalez
(74) *Attorney, Agent, or Firm* — Norman B. Thot

(57) ABSTRACT

A rotation angle measurement system for detecting a shaft rotation. The rotational angle measurement system includes a rotor unit, a stationary stator unit, and a multi-turn sensor unit. The rotor unit is connected to the shaft to rotate therewith. The rotor unit radially surrounds the shaft and has at least one sensor magnet. The multi-turn sensor unit is arranged on the stationary stator unit spaced radially apart from the shaft. The multi-turn sensor unit interacts with the at least one sensor magnet to detect shaft revolutions. The multi-turn sensor unit includes a Wiegand sensor, at least one Hall sensor, an evaluation unit electrically connected to the Wiegand sensor and to the at least one Hall sensor, and a separate sensor unit circuit board which is fastened to the stationary stator unit and on which the Wiegand sensor, the at least one Hall sensor, and the evaluation unit are each arranged.

7 Claims, 3 Drawing Sheets

(56) References Cited

U.S. PATENT DOCUMENTS

| | | | |
|---|---|---|---|
| 8,766,625 B2* | 7/2014 | Mehnert | G01D 5/145 |
| | | | 324/207.2 |
| 2010/0052663 A1 | 3/2010 | Mehnert et al. | |
| 2010/0213927 A1 | 8/2010 | Mehnert et al. | |
| 2011/0196648 A1 | 8/2011 | Mayer et al. | |
| 2013/0200883 A1* | 8/2013 | Mehnert | G01R 33/072 |
| | | | 324/207.2 |
| 2014/0167743 A1 | 6/2014 | Park | |
| 2015/0369636 A1 | 12/2015 | Deak et al. | |
| 2016/0033305 A1* | 2/2016 | Mehnert | G01D 5/145 |
| | | | 324/207.18 |
| 2019/0077256 A1* | 3/2019 | Onaka | G01D 5/245 |

FOREIGN PATENT DOCUMENTS

| | | |
|---|---|---|
| CN | 102165285 A | 8/2011 |
| CN | 103872853 A | 6/2014 |
| DE | 102 59 223 B3 | 2/2004 |
| DE | 10 2009 019 719 A1 | 11/2010 |
| DE | 10 2009 051 978 A1 | 5/2011 |
| EP | 2 159 547 A2 | 3/2010 |
| JP | 2012-505390 A | 3/2012 |
| JP | 2016-503174 A | 2/2016 |

* cited by examiner

ROTATIONAL ANGLE MEASURING SYSTEM

CROSS REFERENCE TO PRIOR APPLICATIONS

This application is a U.S. National Phase application under 35 U.S.C. § 371 of International Application No. PCT/EP2019/068690, filed on Jul. 11, 2019 and which claims benefit to German Patent Application No. 10 2018 117 600.7, filed on Jul. 20, 2018. The International Application was published in German on Jan. 23, 2020 as WO 2020/016098 A1 under PCT Article 21(2).

FIELD

The present invention relates to a rotation angle measurement system for detecting a rotation of a shaft, the rotation angle measurement system comprising a rotor unit connected to the shaft for rotating therewith and radially surrounding the shaft and including at least one sensor magnet, a stationary stator unit, and a multi-turn sensor unit arranged at the stator unit which is radially spaced apart from the shaft and which functionally interacts with the sensor magnet to detect shaft revolutions, and having a Wiegand sensor, at least one Hall sensor, and an evaluation unit which is electrically connected to the Wiegand sensor and the Hall sensor.

BACKGROUND

Such rotation angle measurement systems serve to measure rotations of a shaft and are frequently referred to as an angle measurement apparatus, a rotation angle sensor, or a rotary position transducer. Such systems are in particular used for controlling and monitoring electric motors, in particular servomotors, in machines, plants or vehicles. Contactless rotation angle measurement systems, for example, optical or magnetically excited systems, are of particular importance since they have a long service life due to being a wear-free sensor system.

DE 10 2009 019 719 A1 describes a magnet-based rotation angle measurement system for detecting the rotation of a shaft. In the case of magnet-based rotation angle measurement systems, the revolution of the shaft is purely magnetically or magneto-optically detected by the measurement system. The measurement system comprises a rotating rotor unit on which a plurality of sensor magnets are arranged, and a stationary stator unit on which a multi-turn sensor unit is arranged radially spaced apart from the shaft and including a Wiegand sensor, a Hall sensor, and an evaluation unit. The rotor unit is connected to the shaft for rotation therewith so that during a rotation of the shaft the sensor magnets move past the stationary multi-turn sensor unit, wherein the magnetic field of the sensor magnets is detected by the Wiegand sensor and the Hall sensor of the multi-turn sensor unit.

Depending on the field of application, the shaft measured by the rotation angle measurement system can be configured in different ways and can in particular have different outer diameters. For enabling a reliable detection of the rotation of the shaft, the rotation angle measurement system must be adapted to the particular shaft geometry. Exact alignment between the sensor magnet of the rotor unit and the Wiegand sensor as well as the Hall sensor of the multi-turn sensor unit is here crucial so that the magnetic field of the sensor magnet can be reliably detected by the multi-turn sensor unit during a rotation of the shaft.

SUMMARY

An aspect of the present invention is to provide a rotation angle measurement system for detecting the rotation of a shaft which is adaptable to different shaft geometries in a simple manner.

In an embodiment, the present invention provides a rotation angle measurement system for detecting a rotation of a shaft. The rotational angle measurement system includes a rotor unit, a stationary stator unit, and a multi-turn sensor unit. The rotor unit is connected to the shaft so as to rotate therewith. The rotor unit is configured to radially surround the shaft and comprises at least one sensor magnet. The multi-turn sensor unit is arranged on the stationary stator unit spaced radially apart from the shaft. The multi-turn sensor unit is configured to functionally interact with the at least one sensor magnet so as to detect revolutions of the shaft. The multi-turn sensor unit comprises a Wiegand sensor, at least one Hall sensor, an evaluation unit which is electrically connected to the Wiegand sensor and to the at least one Hall sensor, and a separate sensor unit circuit board which is fastened to the stationary stator unit and on which the Wiegand sensor, the at least one Hall sensor, and the evaluation unit are each arranged.

BRIEF DESCRIPTION OF THE DRAWINGS

The present invention is described in greater detail below on the basis of embodiments and of the drawings in which.

DETAILED DESCRIPTION

Figure 1:
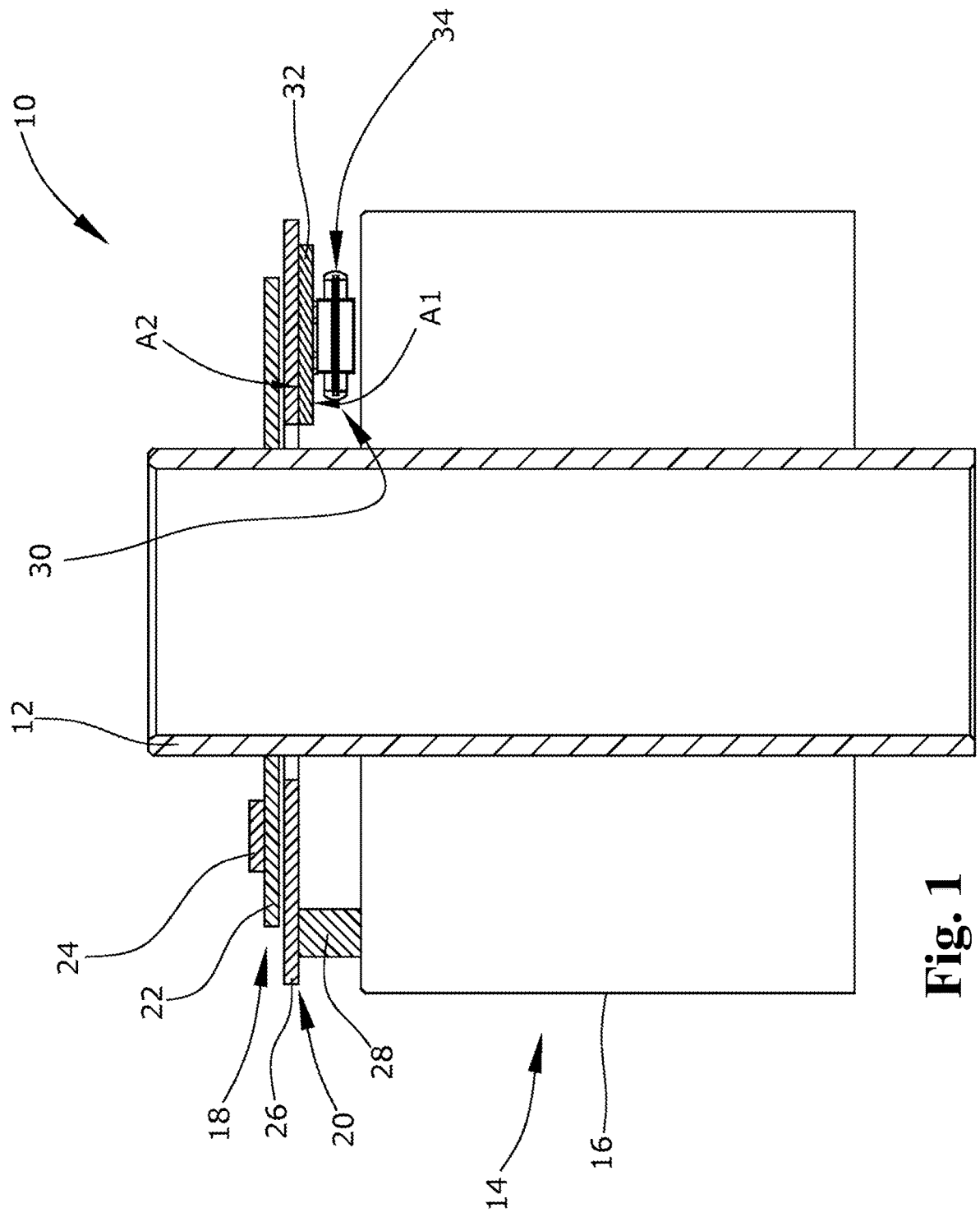
FIG. 1 shows a longitudinal section of a rotation angle measurement system according to the present invention.
Figure 2:
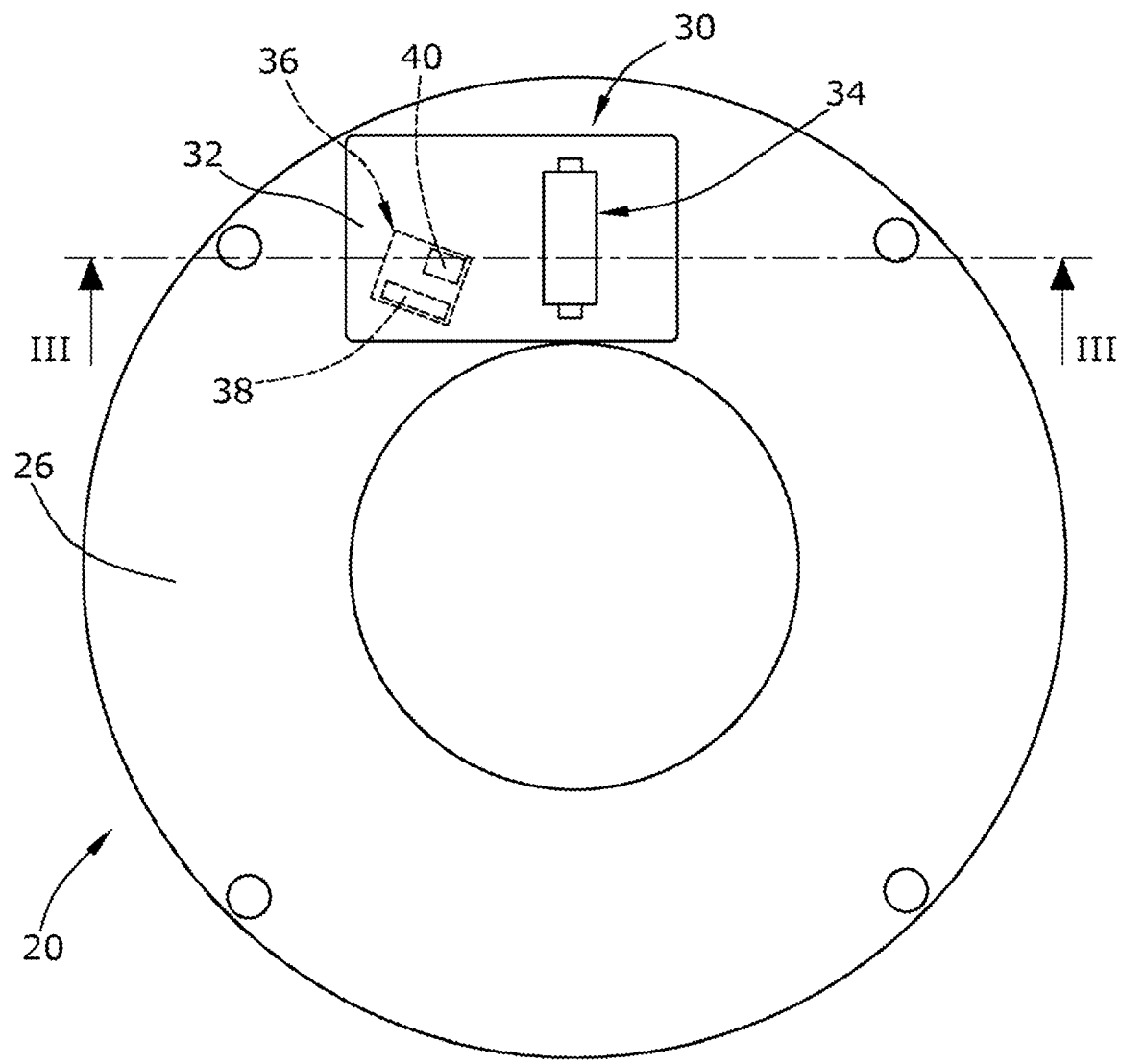
FIG. 2 shows a top view of the axial lower side of a stator unit of the rotation angle measurement system of FIG. 1 on which a multi-turn sensor unit is arranged.
Figure 3:
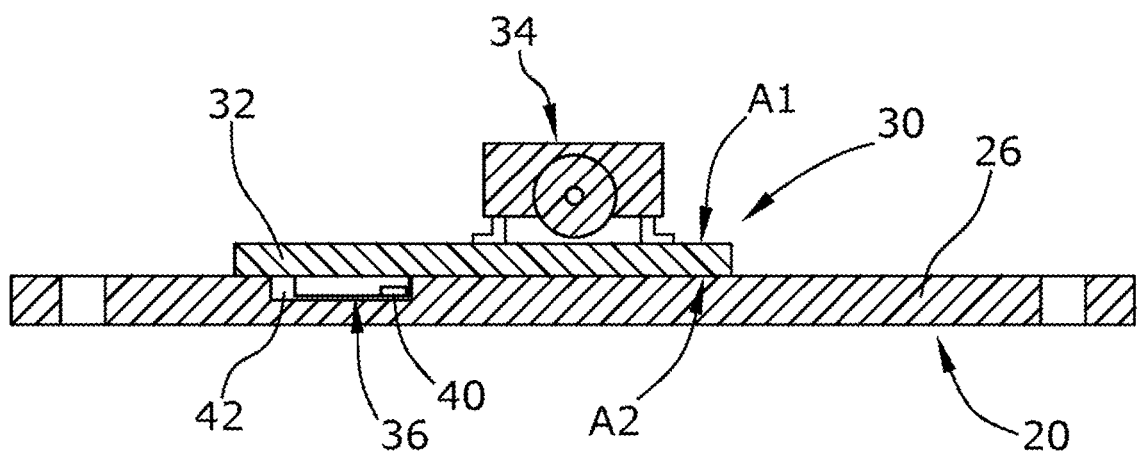
FIG. 3 shows a sectional view of the stator unit and the sensor unit along the line III-III of FIG. 2.
Figure 4:
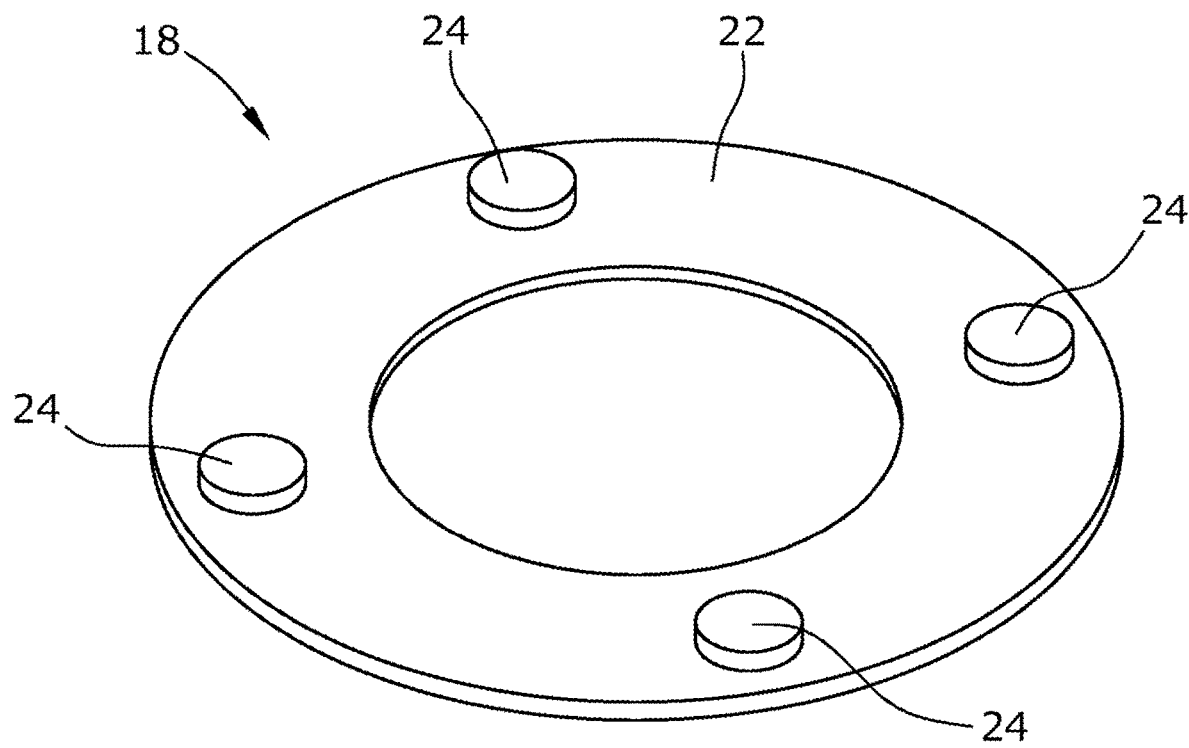
FIG. 4 shows a perspective diagram of the axial upper side of a rotor unit of the rotation angle measurement system of FIG. 1.

According to the present invention, the multi-turn sensor unit comprises a separate sensor unit circuit board which is fastened to the stator unit and on which the Wiegand sensor, the at least one Hall sensor, and the evaluation unit are arranged. The multi-turn sensor unit is thus configured as an independent module which can be positioned at the stator unit and aligned in different ways in a simple manner for providing a reliable detection of the magnetic field of the sensor magnet and thus a reliable detection of the rotation of the shaft depending on the shaft geometry. The rotation angle measurement system according to the present invention is thus adaptable in a simple manner to various shaft geometries.

The Wiegand sensor and the Hall sensor can, for example, be arranged laterally, that is, in the circumferential direction of the shaft, spaced apart from each other on the sensor unit circuit board. Depending on the rotation direction of the shaft, a sensor magnet is thus located either on the lateral side of the Wiegand sensor facing the Hall sensor or on the lateral side of the Wiegand sensor facing away from the Hall sensor, and thus at a different distance to the Hall sensor at the point of time when its magnetic field is detected by the Wiegand sensor. This results in different Hall sensor measurement values for this point of time depending on the rotation direction so that the evaluation of the Hall sensor measurement value for this point of time allows for the rotation direction of the shaft to be determined in a simple manner.

In an embodiment of the present invention, the Wiegand sensor can, for example, be arranged on a first axial side of the sensor unit circuit board, and the Hall sensor can, for example, be arranged on a second axial side of the sensor unit circuit board which is opposite the first axial side. The Hall sensor is here generally arranged on the axial side of the sensor unit circuit board facing the rotor unit so that the sensor magnet is guided past the Hall sensor at a very small axial distance. The magnetic field of the sensor thus includes a large axial magnetic field component at the position of the Hall sensor so that the magnetic field of the sensor can be reliably detected by the Hall sensor. The Wiegand sensor is generally arranged on the axial side of the sensor unit circuit board facing away from the rotor unit and is thus arranged at a larger distance to the sensor magnet. The magnetic field of the sensor thus includes a large transverse magnetic field component at the position of the Wiegand sensor so that the magnetic field of the sensor can be reliably detected by the Wiegand wire of the Wiegand sensor which generally extends radially to the shaft and thus in a transverse plane. The arrangement of the Wiegand sensor and the Hall sensor on opposite axial sides of the sensor unit circuit board thus provides a reliable and exact detection of the rotation of the shaft.

The multi-turn sensor unit advantageously comprises an integrated circuit which provides the evaluation unit and the Hall sensor. Such integrated circuits are commercially available and can be arranged on the sensor unit circuit board in a simple manner. This provides an inexpensive and reliable rotation angle measurement system.

In an embodiment of the present invention, the integrated circuit can, for example, be arranged on the axial side of the sensor unit circuit board facing the rotor unit, and the stator unit can, for example, comprise a recess on the axial side facing away from the rotor unit, into which recess the integrated circuit with the Hall sensor is at least partially immersed. The axial distance between the sensor magnet and the Hall sensor is thus very small so that the magnetic field of the sensor can be reliably detected by the Hall sensor.

The rotor unit can, for example, comprise four sensor magnets which are uniformly distributed along the circumference. The Wiegand sensor can thereby even detect half rotations of the shaft, which enables a reliable detection of the rotation of the shaft.

In an embodiment of the present invention, the shaft can, for example, be a hollow shaft. The rotation angle measurement system according to the present invention is in particular also suitable for detecting the rotation of a hollow shaft, where a conventional arrangement of the sensor system at an axial end of the shaft is not possible absent special provisions.

A capacitive single-turn sensor unit for detecting partial rotations of the shaft is advantageously provided which comprises a first single-turn sensor element connected to the shaft for rotating therewith and a stationary second single-turn sensor element. The capacitive single-turn sensor unit can be integrated into the rotation angle measurement system in a simple manner and provides a particularly exact detection of the shaft rotation.

An exemplary embodiment of a rotation angle measurement system according to the present invention is described below under reference to the accompanying drawings.

FIG. 1 shows a rotation angle measurement system 10 for detecting the rotation of a shaft 12. In the present exemplary embodiment, the shaft 12 is a hollow shaft which essentially extends in an axial direction and is driven by a drive motor 14 having a static motor housing 16. The rotation angle measurement system 10 comprises a rotor unit 18 and a stator unit 20.

The rotor unit 18 comprises a rotor circuit board 22 which radially surrounds the shaft 12 and is directly fastened to the shaft 12. The rotor unit 18 is thus connected to the shaft 12 for rotating therewith. Four sensor magnets 24 are arranged on the axial upper side of the rotor circuit board 22 in a uniformly distributed manner along the circumference thereof. The stator unit 20 comprises a stator circuit board 26 radially surrounding the shaft 12. The stator circuit board 26 is fastened in a stationary manner to the static motor housing 16 via a plurality of stator fasteners 28.

A multi-turn sensor unit 30 is arranged radially spaced apart from the shaft 12 on the axial lower side of the stator circuit board 26. The multi-turn sensor unit 30 comprises a separate sensor unit circuit board 32 on which a Wiegand sensor 34 and an integrated circuit 36 are arranged. The sensor unit circuit board 32 is fastened to the axial lower side of the stator circuit board 26, for example, via an adhesive bond or a plug connection. The integrated circuit 36 comprises an evaluation unit 38 and a Hall sensor 40 which are electrically connected to each other. The evaluation unit 38 is further electrically connected to the Wiegand sensor 34 and is connected to a nonvolatile data memory (which is not illustrated in detail) via signals in which nonvolatile data memory a revolution counter value of the evaluation unit 38 is stored and read. The integrated circuit 36 further comprises a control logics (which is not illustrated in detail) and a power management unit (which is not illustrated in detail) which enable a self-sufficient power operation of the multi-turn sensor unit 30 using electric power from the Wiegand sensor 34. The basic functionality of the multi-turn sensor unit 30 is essentially described in DE 102 59 223 B3 which is here incorporated by reference in connection therewith.

The Wiegand sensor 34 is arranged on a first axial side A1, here the axial lower side, of the sensor unit circuit board 32 and is fastened to the sensor unit circuit board 32. The integrated circuit 36 is arranged on a second axial side A2, here the axial upper side, of the sensor unit circuit board 32 opposite the first axial side A1, and is fastened to the sensor unit circuit board 32. The integrated circuit 36 is essentially completely immersed into a corresponding stator circuit board recess 42 formed on the axial lower side of the stator circuit board 26. The multi-turn sensor unit 30 is positioned and aligned so that during a rotation of the shaft 12, the magnetic fields of the four sensor magnets 24 co-rotating with the shaft 12 can be reliably detected by both the Wiegand sensor 34 and the Hall sensor 40. The Wiegand sensor 34 and the integrated circuit 36 are arranged on the sensor unit circuit board 32 radially spaced apart from each other so that the Wiegand sensor 34 and the Hall sensor 40 are positioned so that they are offset from each other in the circumferential direction. Once the Wiegand sensor 34 detects the magnetic field of a sensor magnet 24, the evaluation unit 38 evaluates a Hall sensor measurement value determined by the Hall sensor 40. Depending on the rotation direction of the shaft 12, the sensor magnet 24 is located either on the lateral side of the Wiegand sensor 34 facing the Hall sensor 40 or on the lateral side of the Wiegand sensor 34 facing away from the Hall sensor 40, and thus at a different distance to the Hall sensor 40 at this detection time. Depending on the rotation direction, this results in different Hall sensor measurement values for the detection time so that the evaluation of the Hall sensor measurement value for the detection time allows for the rotation direction of the shaft 12 to be determined in a simple manner.

For improving the angular resolution, the rotation angle measurement system 10 comprises a capacitive single-turn sensor unit (which is not illustrated in detail) having a first single-turn sensor element which is arranged on the axial lower side of the rotor unit 18 and is thus connected to the shaft 12 for rotating therewith, and having a second sensor element which is arranged in a stationary manner on the axial upper side of the stator unit 20. The rotation angle measurement system 10 further comprises a central logic unit (which is not illustrated in detail) which is connected to the multi-turn sensor unit 30 and the single-turn sensor unit via signals for determining both the absolute number of shaft rotations and the current relative rotation angle of the shaft. The central logic unit can be implemented by a microcontroller or by a so-called "field programmable gate array" (FPGA).

The present invention is not limited to embodiments described herein; reference should be had to the appended claims.

LIST OF REFERENCE NUMERALS

10 Rotation angle measurement system
12 Shaft
14 Drive motor
16 Static motor housing
18 Rotor unit
20 Stator unit
22 Rotor circuit board
24 Sensor magnets
26 Stator circuit board
28 Stator fasteners
30 Multi-turn sensor unit
32 Sensor unit circuit board
34 Wiegand sensor
36 Integrated circuit
38 Evaluation unit
40 Hall sensor
42 Stator circuit board recess
A1 First axial side
A2 Second axial side

What is claimed is:

1. A rotation angle measurement system for detecting a rotation of a shaft, the rotational angle measurement system comprising:
    a rotor unit which is connected to the shaft so as to rotate therewith, the rotor unit being configured to radially surround the shaft and comprising at least one sensor magnet;
    a stationary stator unit comprising a stator circuit board; and
    a multi-turn sensor unit which is arranged on the stator circuit board spaced radially apart from the shaft, the multi-turn sensor unit being configured to functionally interact with the at least one sensor magnet so as to detect revolutions of the shaft, the multi-turn sensor unit comprising,
        a Wiegand sensor,
        at least one Hall sensor,
        an evaluation unit which is electrically connected to the Wiegand sensor and to the at least one Hall sensor, and
        a separate sensor unit circuit board which is fastened to the stator circuit board and on which the Wiegand sensor, the at least one Hall sensor, and the evaluation unit are each arranged.

2. The rotation angle measurement system as recited in claim 1, wherein the Wiegand sensor and the at least one Hall sensor are arranged on the separate sensor unit circuit board spaced laterally apart from each other.

3. The rotation angle measurement system as recited in claim 1, wherein,
    the separate sensor unit circuit board comprises a first axial side and a second axial side which is arranged opposite to the first axial side, and
    the Wiegand sensor is arranged on the first axial side of the separate sensor unit circuit board and the at least one Hall sensor is arranged on the second axial side of the separate sensor unit circuit board.

4. The rotation angle measurement system as recited in claim 3, wherein,
    the multi-turn sensor unit further comprises an integrated circuit, and
    the integrated circuit defines the evaluation unit and the at least one Hall sensor.

5. The rotation angle measurement system as recited in claim 4, wherein,
    the integrated circuit is arranged on the second axial side of the separate sensor unit circuit board, and
    the stator circuit board comprises a recess on an axial side facing away from the rotor unit in which the integrated circuit is at least partially arranged.

6. The rotation angle measurement system as recited in claim 1, wherein the rotor unit further comprises four sensor magnets which are uniformly distributed along a circumference of the rotor unit.

7. The rotation angle measurement system as recited in claim 1, wherein the shaft is a hollow shaft.

* * * * *